United States Patent
Mazouchi et al.

(10) Patent No.: US 10,630,793 B2
(45) Date of Patent: Apr. 21, 2020

(54) BROWSER FINGERPRINTING

(71) Applicant: Reflektion, Inc., San Mateo, CA (US)

(72) Inventors: Ali Mazouchi, Sunnyvale, CA (US); Amar Chokhawala, Saratoga, CA (US); Anusha Kusam, Sunnyvale, CA (US)

(73) Assignee: REFLEKTION, INC., San Mateo, CA (US)

(*) Notice: Subject to any disclaimer, the term of this patent is extended or adjusted under 35 U.S.C. 154(b) by 119 days.

(21) Appl. No.: 15/788,466

(22) Filed: Oct. 19, 2017

(65) Prior Publication Data
US 2019/0124168 A1  Apr. 25, 2019

(51) Int. Cl.
*H04L 29/08* (2006.01)
*G06F 16/9535* (2019.01)

(52) U.S. Cl.
CPC .......... *H04L 67/22* (2013.01); *G06F 16/9535* (2019.01); *H04L 67/303* (2013.01)

(58) Field of Classification Search
CPC ........................................................ H04L 67/22
See application file for complete search history.

(56) References Cited

U.S. PATENT DOCUMENTS

| | | | | |
|---|---|---|---|---|
| 9,165,124 | B1* | 10/2015 | Gurevich | G06F 21/44 |
| 9,836,178 | B2* | 12/2017 | Twig | G06F 3/048 |
| 2007/0253608 | A1* | 11/2007 | Tulyakov | G06K 9/00073 |
| | | | | 382/125 |
| 2009/0083269 | A1* | 3/2009 | Artz, Jr. | H04L 63/10 |
| 2010/0088404 | A1* | 4/2010 | Mani | H04L 67/125 |
| | | | | 709/224 |
| 2010/0305989 | A1* | 12/2010 | Mu | G06Q 10/0635 |
| | | | | 705/7.28 |

(Continued)

FOREIGN PATENT DOCUMENTS

WO     2015200414     12/2015

OTHER PUBLICATIONS

Zimmeck et al. "A Privacy Analysis of Cross-Device Tracking" https://www.usenix.org/conference/usenixsecurity17/technical-sessions/presentation/zimmeck.

(Continued)

*Primary Examiner* — Lashonda T Jacobs
(74) *Attorney, Agent, or Firm* — David R. Stevens; Stevens Law Group

(57) ABSTRACT

Browser requests are received and data included in it is added to a vector. If explicit identification information (username, cookie data, etc.) is present, the vector is associated with a pre-existing user record, which is then updated. If not, candidate user records may be identified according to correspondence with values in the vector. This may include comparing hashes of one or more values to identify similarities. Candidate vectors may be eliminated by identifying inconsistency in OS, device, and browser information. Probability assigned to each candidate vector may be adjusted, e.g., reduced, in response to inconsistency in other data relating to a browser, device, or of a more global nature, e.g. time zone, user attributes, etc. Records associated with different devices may be associated with one another by evaluating hashes of data values submitted by a user on the different devices. Where the hash values of two records intersect, they may be merged with one another.

17 Claims, 7 Drawing Sheets

(56) References Cited

U.S. PATENT DOCUMENTS

| | | | |
|---|---|---|---|
| 2011/0093503 A1* | 4/2011 | Etchegoyen | G06F 21/121 |
| | | | 707/780 |
| 2012/0084206 A1* | 4/2012 | Mehew | G06Q 40/00 |
| | | | 705/44 |
| 2012/0311027 A1* | 12/2012 | Salusky | H04L 63/126 |
| | | | 709/203 |
| 2014/0279851 A1* | 9/2014 | Rangarajan | H04L 67/04 |
| | | | 707/609 |
| 2014/0280009 A1* | 9/2014 | Hage | H04L 67/2842 |
| | | | 707/709 |
| 2015/0039902 A1 | 2/2015 | Arya et al. | |
| 2015/0066951 A1 | 3/2015 | Natarajan et al. | |
| 2015/0067472 A1* | 3/2015 | Chen | G06F 16/9577 |
| | | | 715/234 |
| 2016/0006841 A1* | 1/2016 | Gurevich | H04L 63/101 |
| | | | 709/203 |
| 2016/0134648 A1 | 5/2016 | Falkowitz et al. | |
| 2016/0155128 A1* | 6/2016 | Desai | G06Q 20/4016 |
| | | | 705/44 |

OTHER PUBLICATIONS

Boda et. al "User Tracking on the Web via Cross-Browser Fingerprinting1" https://pet-portal.eu/files/articles/2011/fingerprinting/cross-browser_fingerprinting.pdf.

Eckersley "How Unique Is Your Web Browser?"https://panopticlick.eff.org/static/browser-uniqueness.pdf.

* cited by examiner

BROWSER FINGERPRINTING

RELATED APPLICATIONS

This application is related to U.S. application Ser. No. 15/788,498, filed Oct. 19, 2017, which is incorporated herein by reference for all purposes.

BACKGROUND

Retailers may implement user accounts such that all of a user's browsing and purchasing activity may be aggregated and used to facilitate understanding of the user's interest and behavior. Websites may also implement cookies that are stored within the user's browser that enable the user to be identified each time the user visit's the website.

These approaches have limitations. Users may access various sites that do not share account information with one another. Users may fail to log in, decline to accept cookies, clear cookies, or browse in incognito mode. These result in missed opportunities to understand the interests and behavior of a user.

The systems and methods disclosed herein provide an improved approach for associating a visit to a web site with a particular user in the absence of cookies or a login to an existing account.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
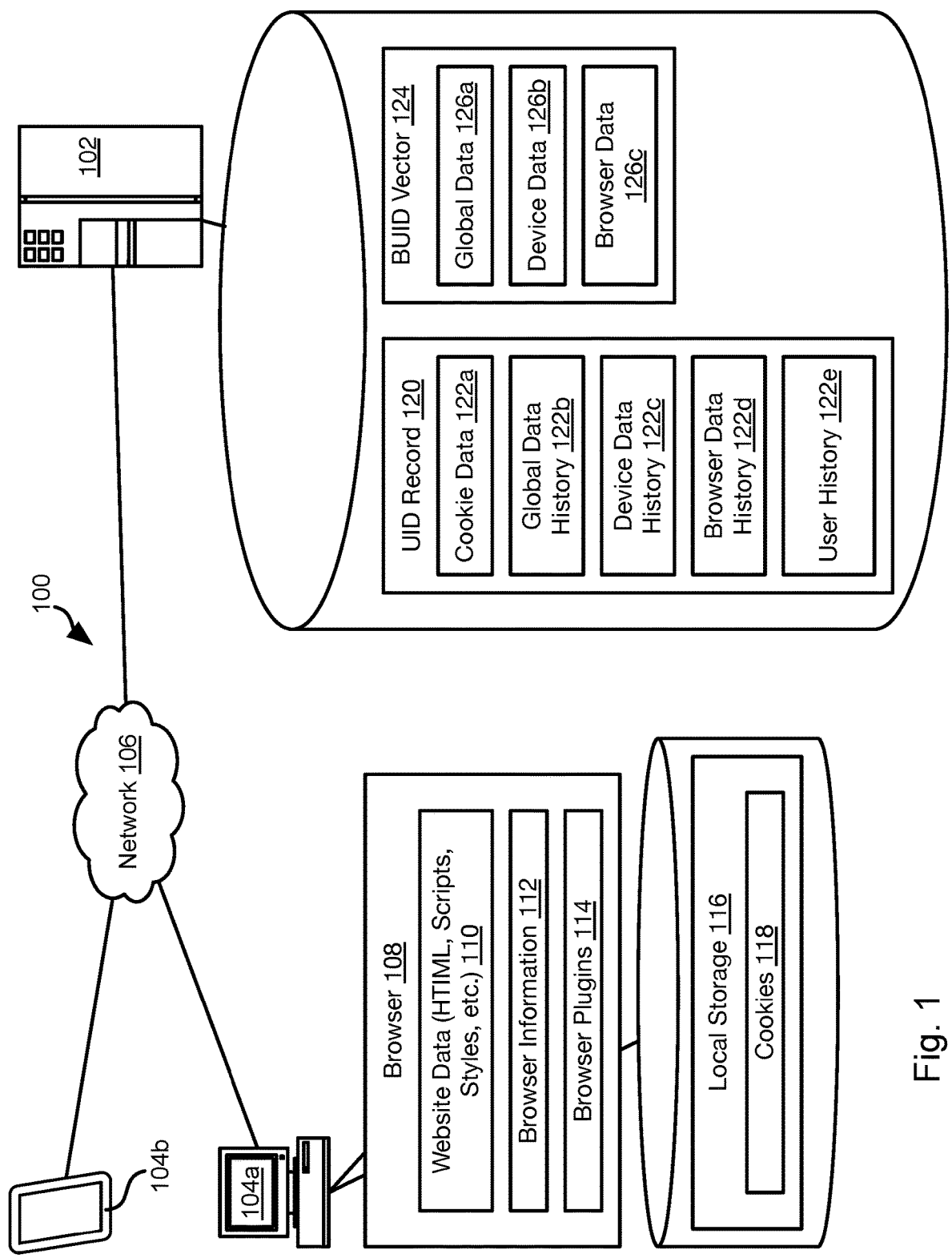
FIG. 1 is a schematic block diagram of a network environment for performing methods in accordance with an embodiment of the present invention.

The methods disclosed herein may be implemented in a network environment 100 including some or all of the illustrated components. In particular, a server system 102 may execute the methods disclosed herein with respect to browsing activity of one or more user computers 104*a*, 104*b*. The computers 104*a*, 104*b* may include desktop or laptop computers, tablet computers, smart phones, wearable computers, internet enabled appliances, or any other type of computing device.

The browsing activities of the computers 104*a*, 104*b* may include webpage requests submitted by the computers 104*a*, 104*b* to a web server executing on the server system 102 or be reported to the server system 102 by a third party server or by a software component executing on the computers 104*a*, 104*b*.

The computers 104*a*, 104*b* maybe coupled to the server system 102 by means of a network 106 including a local area network (LAN), wide area network (WAN), the Internet, or any other number of wired or wireless network connections. The network 106 may be understood to possibly include one or more intermediate servers by way of which browsing activities of the computers 104*a*, 104*b* are transmitted to the server system 102.

The computers 104*a*, 104*b* may execute a browser 108 programmed to retrieve and process data 110, such as by rendering web pages, execute scripts within web pages, formatting website data according to style sheets (e.g., .css files). The browser 108 may execute scripts or process web forms that cause the browser 108 to transmit data submitted through web pages to a source of a web page or some other server system, such as the server system 102.

Communications from the browser 108 may include one or more items of information 112 about the browser itself, such as a type (SAFARI, EXPLORER, FIREFOX, CHROME, etc.) as well as a version of the browser. The browser information 112 may include information about the device 104*a*, 104*b* on which it is executing such as operating system (WINDOWS, MACOS, IOS, LINUX, etc.), operating system version, processor type, screen size, peripheral devices (e.g., additional screens, audio device, camera), etc. Browser information may include a current time, time zone, font information, storage accessibility (size of local storage 116 described below), location information (e.g., longitude and latitude, city, address, etc.), accessibility information, and the like. This information is used according to the methods disclosed below and may be included in browser requests. Other information (e.g., fonts) may be obtained using executable code executing on one or both of the server system 102 or embedded in website data 110.

The browser 108 may execute one or more browser plugins 114 that extend or enhance the functionality of the browser, such as ADOBE ACROBAT READER, ADOBE FLASH PLAYER, JAVA VIRTUAL MACHINE, MICROSOFT SILVERLIGHT, and the like. In some embodiments, the browser information 112 and listing of plugins 114 may be transmitted with requests for web pages or be accessible by scripts executed by the browser, which may then transmit this information to the server system 102 directly or by way of another server system.

The computer 104*a*, 104*b* may further include local storage 116 that includes browser-related data such as cookies 118 that are stored by websites visited using the computer 104*a*, 104*b*.

The server system 102 stores information gathered from browser requests or received from third party servers in one of a user identifier (UID) record 120 and a browser user identifier (BUD) vector 124. As described below, a UID record 120 stores data received from a browser that is explicitly mapped to a particular user identifier. A most common example, is due to the browser storing a cookie 118 that has previously been stored on a source 104*a*, 104*b* of the browser request and either received with the browser request or accessed by a script or other executable embedded in a website and transmitted to the server system 102.

Browser requests may include metadata that is stored in the UID record 120 when the browser request is explicitly mapped to cookie data 122*a* or other user identifiers included in the UID record 120. The UID record 120 may also include data from browser requests lacking explicit identification information but mapped to the UID record 120 with sufficient certainty according to the methods disclosed herein.

The browser data may include various types of data that are organized herein into three categories: global data history 122*b*, device data history 122*b*, and browser data history 122*d*.

The global data history 122*b* stores values from browser requests that is independent of the browser or device from which the request was received, such as time zone, language, a time stamp in the browser request, IP (internet protocol) address, location (if accessible), and the like.

The device data history 122*c* stores values from browser requests relating to the computer 104*a*, 104*b* that generated the browser request such as operating system, operating system version, screen size, available devices, battery state, power source, a listing of installed fonts, and the like.

The browser data history 122*d* stores value from browser requests relating to the browser from which it was received, such as the browser type (SAFARI, EXPLORER, FIRE-FOX, CHROME, etc.), browser version, plugins available in the browser, cookies, cookie accessibility, size and accessibility of the local storage 116 for the browser, size and accessibility of session storage, audio configuration data, video configuration data, navigator data, and the like.

The UID record 120 may further include a user history 122*e*. Browser requests may include requests for web pages (e.g., URLs). User interactions with a website may also be recorded in the user history 122*e*, e.g. search terms, links clicked, values submitted into fillable forms, etc. These values may be stored in raw form and may additionally or alternatively be processed to estimate user attributes (age, income, gender, education) and interests that are stored in the user history 122*e* as well.

In response to a browser request that does not include cookie data 122*a* or other user identifiers, the server system 102 may create a BUID vector 124 that includes some or all of global data 126*a*, device data 126*b*, and browser data 126*c* included in the browser request. The data 126*a*-126*c* may include some or all of the values described above as being included in the data histories 122*b*-122*d*.

Figure 2:
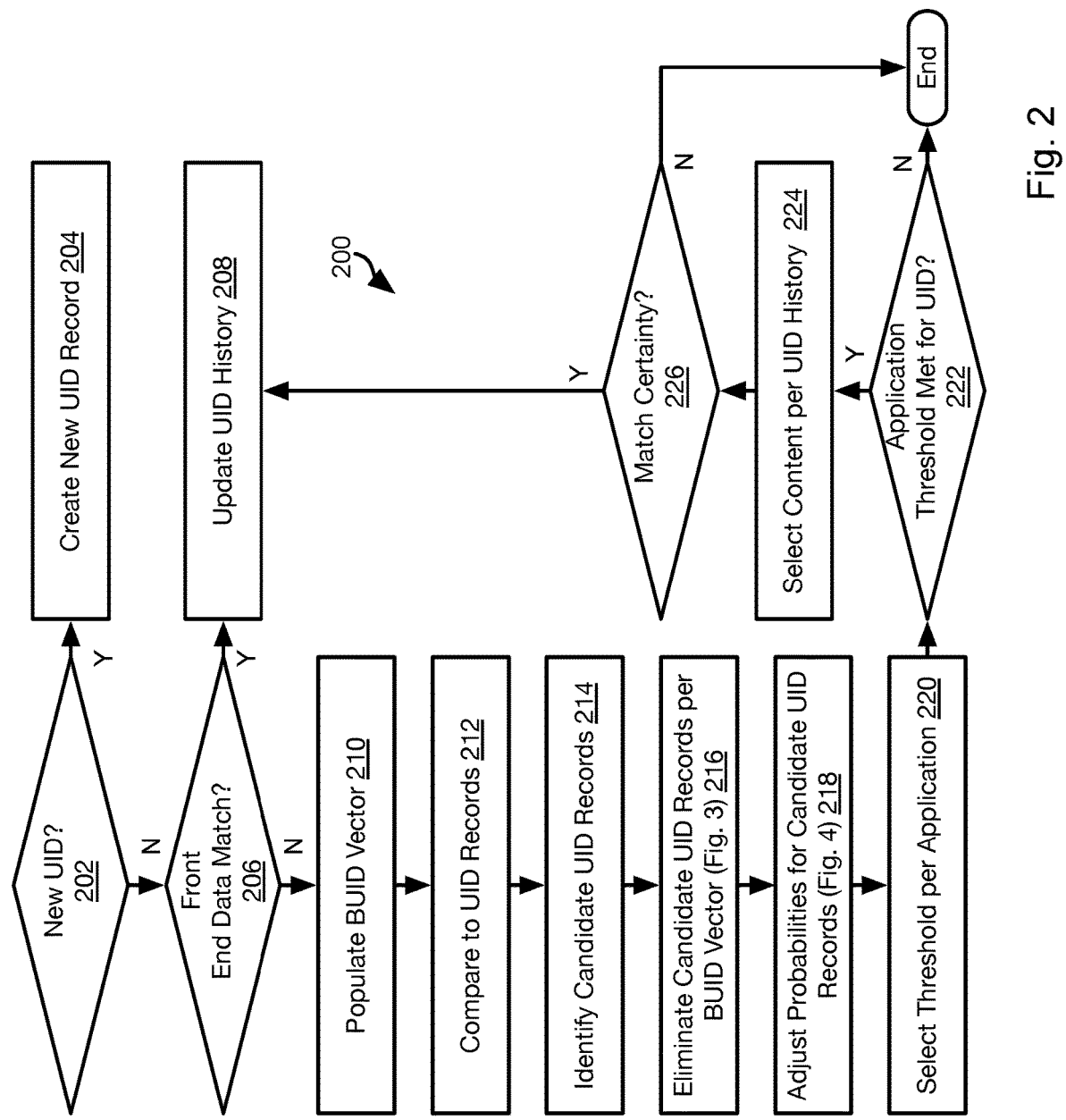
FIG. 2 is a process flow diagram of a method for associating a visit to a website with a user identifier in accordance with an embodiment of the present invention.

Referring to FIG. 2, the illustrated method 200 may be executed by the server system 102 in response to receiving a browser request, also often referred to as a browser introduction. The "browser request" as discussed herein may include some or all of information in a header of the browser request, data submitted by the user in the browser request, information gathered by a script returned in response to the browser request and executing in the browser, or any other information submitted by a user as part of browser session including the browser request.

The method 200 may include evaluating 202 whether the browser request is in the context of a browser session in which a new UID is created, e.g. a user creates a new account or otherwise provides an indication that a UID record 120 does not currently exist for the user that invoked the browser request. If so, then a new UID record 120 is created and populated with data from the browser request and possibly identification information provide as part of the browser session including the browser request, such as cookie data 122*a* placed on the computer 104*a*, 104*b* or a user name assigned to the user.

If not, the method 200 may include evaluating 206 whether the browser request includes sufficient data for a "front end" data match, i.e. the browser request includes cookie data, a user name, or other explicit identifiers that are uniquely associated with a UID record 120. Step 206 may be executed by a script executed by the browser or on the server system 102. If a front end match is found 204, then some or all of the history data 122*a*-122*e* may then be updated 208 according to data included in the browser request and other information received during the browser session initiated by the browser request.

The data that may be used for a front end data match may include a ULID (user link ID), ckid (third party cookie ID), bkid (back end identifier provided by the server system 102). Note that the ULID may include any identification information that is provided by vendors and clearly identifies a user, such as username, email, user ID, or a hash of an input field that may be used for unique identification. If any of these are present in a browser request, a corresponding UID record 120 may be uniquely associated with the browser request. In some embodiments, local storage of the browser may include identifying information, such as a username or other identifier. Accordingly, a script executing in the browser may obtain this information and return it to the server system 102, thereby enabling a front end data match at step 204.

If a front end match is found 206 not to be possible, the method 200 may include populating 210 a BUID vector 124 with data from the browser request. This BUID vector 124 may then be compared 212 to one or more UID records 120 to identify 214 one or more, typically several, candidate UID records. Of these candidate records, one or more of them may then be evaluated and eliminated 216 as being inconsistent. An example implementation of steps 214-216 is described with respect to FIG. 3, below.

Of those that remain, a probability associated with each candidate record may be maintained the same or adjusted 218 based on consistency with values included in the BUID vector 124. An example of this process is described below with respect to FIG. 4.

The method 200 may further include selecting a threshold according to an application of the method 200, i.e. a purpose for which any corresponding UID record 120 will be used. For example, for purposes of selecting an advertisement, an exact match is not required. Step 220 may be an essentially manual step, with the application being known and the corresponding threshold being predetermined for that application.

If the probability threshold for the given application is found 222 to be met by one or more candidate records 120, then one of them may be selected as corresponding to the same user that generated the browser request and one or more actions may be taken, such as selecting 224 content according to the user history 122*e* of the selected candidate record 120. Where only one candidate record is found 222 to meet the threshold, it may be selected. Where multiple records meet the threshold, the candidate record with the highest probability after step 218 may be selected for use at step 224. Content selected at step 224 may then be transmitted to the source of the browser request in the form of advertisements, search results, relevant articles, other media content, or the like.

If the candidate record 120 is also found 226 to meet a certainty threshold, which may be higher than the threshold of step 222, the data 126a-126c of the BUID vector 124 may be used to update 208 the data histories 122a-122e of the candidate record 120. For example, a certainty threshold may be a predetermined value, such as a value of 95 percent or higher.

Figure 3:
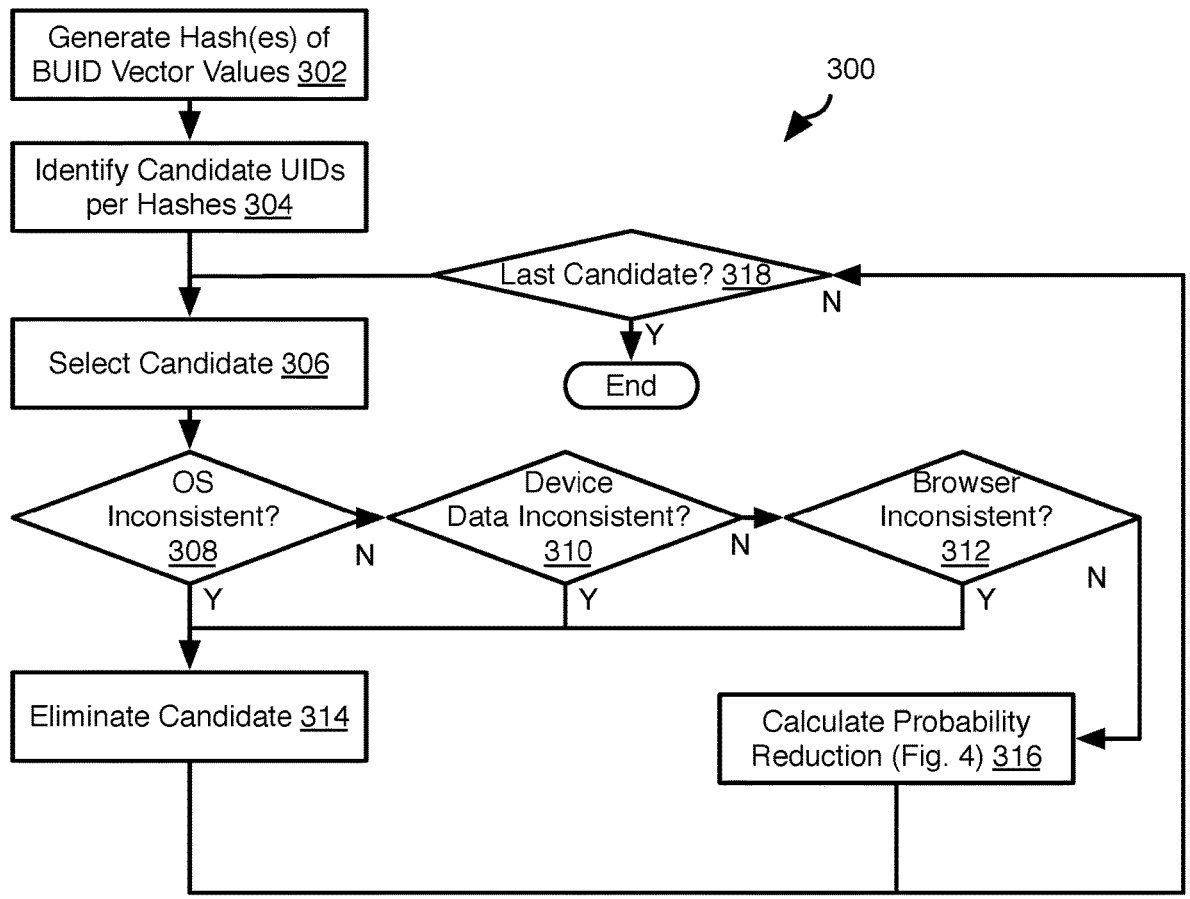
FIG. 3 is a process flow diagram of a method for identifying candidate user records for a visit to a website and eliminating possible candidates in accordance with an embodiment of the present invention.

Referring to FIG. 3, the illustrates an example method 300 for identifying 214 and eliminating 216 candidate records 120 for a particular BUID vector 124 ("the subject vector").

The method 300 may include generating one or more hashes of the subject vector. This may include generating some or all of: generating a hash of the entire subject vector, generating labeled hashes of the values of the subject vector (each hash will indicate the field or attribute of the value from which the each was made), generating unlabeled hashes of the values of the subject vector (field or attribute of the value will not be retained or considered). The hash function may be a lossy function such that each output of the hash function could represent a range of possible input values. The hash function is also preferably such that the range of possible input values are similar to one another, e.g. a contiguous range of values. For example, MD5 and similar hash functions are also suitable. Other hash functions known in the art may also be used.

The method 300 may then include identifying one or more candidate UID records 120 ("candidate records") based on comparison to the hashes. In particular, one or more hashes of values in each record of a plurality of UID records 120 may be generated, such as in the same manner as for the subject vector at step 302.

Candidate records may be identified as having one or more hashes equal to hashes of the subject vector. Where hashes are labeled, this may include determining that hashes for one or more labels in a candidate record match hashes with the same labels in the subject vector. In some embodiments, matching hashes may be processed according to a function that determines a probability according to the number and possibly labels of the matching hashes. For example, one label may have a higher weight such that matching hashes for that label will increase the probability more than another label.

Those UID records 120 having probabilities above a threshold may be identified 304 as candidate records. Each of the candidate records may be selected 306 and evaluated based some or all of steps 308, 310, 312. Steps 308, 310, 312 may be performed in the illustrated or in a different order. Those that are found to be inconsistent at steps 308, 310, 312 are eliminated 314 from among the candidate records. Those that are found to be consistent are processed at step 316 wherein the probabilities associated with them may be adjusted according to the method 400 of FIG. 4. Once the last candidate record is found 318 to have been evaluated according to some or all of steps 308, 310, 312, the method 300 ends.

Step 308 includes evaluating whether operating system information in the candidate record is inconsistent with operating system information included in the subject vector. Note that a candidate record may be associated with a particular user and may record activities of the user from multiple devices over time. Accordingly, the evaluation of step 308 may include evaluating whether at least one instance of operating system information in the candidate record is consistent. If not, the candidate record is determined to be inconsistent. For example, step 308 may implement some or all of the following logic:

1. If no operating system listed the candidate record is the same type of operating system (WINDOWS, MACOS, IOS, LINUX, etc.) than what is included in the subject vector, then the candidate record is inconsistent.
2. If none of the listed operating systems of the candidate record are an earlier version of the type of operating system of the subject vector, than the candidate record is inconsistent.
3. If none of the listed operating systems of the same type as the subject vector also has a version number that is different from a version number of the operating system in the subject vector by less than a threshold amount, then the candidate record may be determined to be inconsistent. The time-dependent threshold may be a function of an elapsed time between a last-received operating system version of the candidate record of the same type and a time include in the browser request of the subject vector. In particular, the time-dependent threshold increases with increase in the elapsed time. Accordingly, large changes over small elapsed times will be deemed inconsistent.

Step 310 includes evaluating whether device information in the candidate record is inconsistent with device information included in the subject vector. For example, step 310 may evaluate whether the candidate record includes reference to a device with identical values for some or all of the following labels: OS name and version, device type and version, availability of audio device(s), availability of camera(s), screen size, average network speed and the like. If not, the method 300 determines that the candidate record is inconsistent.

Step 312 includes evaluating whether browser information in the candidate record is inconsistent with browser information included in the subject vector. Note that a candidate record may be associated with a particular user and may record activities of the user from multiple devices over time. Accordingly, the evaluation of step 312 may include evaluating whether at least one instance of browser information in the candidate record is consistent. If not, the candidate record is determined to be inconsistent. For example, step 312 may implement some or all of the following logic:

1. If no browser listed the candidate record is the same type of browser (EXPLORER, SAFARI, FIREFOX, CHROME, etc.) than what is included in the subject vector, then the candidate record is inconsistent.
2. If none of the listed browsers of the candidate record are an earlier version of the type of browser of the subject vector, than the candidate record is inconsistent.
3. If none of the listed browsers of the same type as the subject vector also has a version number that is different from a version number of the browser in the subject vector by less than a threshold amount, then the candidate record may be determined to be inconsistent. The time-dependent threshold may be a function of an elapsed time between a last-received browser version of the candidate record of the same type and a time include in the browser request of the subject vector. In particular, the time-dependent threshold increases with increase in the elapsed time. Accordingly, large changes over small elapsed times will be deemed inconsistent.

Note that the evaluation of the version and type of a browser may be used in an identical manner to evaluate the type and version of other components or modules executed by a browser, such as a specific plugin, webkit, and the like. Accordingly, if backward movement in version number is found from the candidate record to the BUD vector, the candidate record may be eliminated.

Note also that evaluating the version of a browser, plugin, or other component or module may include evaluating a hashes of version number in order to save space. Accordingly, only differences in version number that are sufficiently large to change the hash value will result in the possibility of detection of a difference according to the method 300.

The evaluations of steps 308, 310, 312 are just examples of criteria that may be used to eliminate a candidate record. Other criteria may be used in addition to, or in place of, the illustrated criteria. For example:

1. If a time range of the browser session of the BUID vector overlaps the time range of a browser session recorded in the candidate record, the candidate record may be eliminated.
2. If a hash of a password submitted to a URL submitted in the browser session of the BUID vector does not match a hash of a password submitted to the same URL as recorded in a candidate record, the candidate record may be eliminated. This may be effective inasmuch as even if a password is changed, the user is typically required to submit the old password and therefore both the old and new passwords will be recorded for the URL. Hashes of other user-submitted values (name, email, or other non-time-varying attributes) may be constrained to be identical in order for a candidate record to escape elimination according to the method 300.
3. Unique device parameters such as battery capacity, battery charging time, and battery discharge time may be invariant with time. Accordingly, where these parameters do not match between the BUID vector and the candidate record, the candidate record may be eliminated Referring to FIG. 4, the illustrated method 400 may be used to adjust the probability for candidate records that are not eliminated at step 314. As is apparent, the method 400 evaluates various values in order to adjust the probability of a candidate record. The method 400 may be executed with respect to each candidate record of the remaining candidate records ("the candidate record"). The probability that is adjusted may be a probability as determined at step 304 or may be initialized to some other value. As is apparent in FIG. 4, where inconsistency in data for a given label is found, the probability for the candidate record may be reduced. The amount of this reduction may be the same for each label evaluated or may be different as determined by an operator.

The method 400 may include evaluating 402 whether one or more "Accept" parameters in a header of the browser request correspond to those in the candidate record.

For example, whether a language in the subject vector matches a language included in the candidate record. A browser request may include multiple languages. Accordingly, step 402 may include evaluating whether each and every language in the subject vector is found in the candidate record. If not, then the probability of the candidate record is reduced 404. In some embodiments, the amount of the reduction increases with the number of languages in the subject vector that are not found in the candidate record.

Other accept parameters include supported encodings (for encryption, images, audio, video, etc.) listed in the header. If one or more of these other parameters are not found in the candidate record, then the probability of the candidate record is reduced 404.

The method 400 may include evaluating 406 whether at least one plugin in the subject vector matches a plugin included in the candidate record. A browser request may include a list of multiple plugins. Accordingly, step 406 may include evaluating whether each and every plugin in the subject vector is found in the candidate record. If not, then the probability of the candidate record is reduced 408. In some embodiments, the amount of the reduction increases with the number of plugins in the subject vector that are not found in the candidate record. Plugins are received as a list in each browser request. Accordingly, the probability is reduced 424 unless a plugin list in a previous browser request recorded in the candidate record exactly matches the plugin list of the candidate record. The probability may be reduced 424 by the number of difference between the closest matching plugin list of the candidate record and the plugin list of the subject vector.

The method 400 may include evaluating 410 whether at least one font in the subject vector matches a font included in the candidate record. A browser request may include one or more fonts. Accordingly, step 410 may include evaluating whether each and every font in the subject vector is found in the candidate record. If not, then the probability of the candidate record is reduced 412. In some embodiments, the amount of the reduction increases with the number of fonts in the subject vector that are not found in the candidate record.

The method 400 may include evaluating 414 whether a time zone in the subject vector is found in the candidate record. In particular, step 414 may include evaluating a difference in a time zone in the subject vector relative to a last time zone in the candidate record, i.e. a time zone obtained from a last-received browser request that has been used to update the candidate record. The last-received browser request may have a first time in it. The subject vector also has a second time in it that is obtained from the browser request used to generate it. A difference in the last-received time zone of the candidate record may be compared to the time zone of the subject vector. If the difference exceeds a threshold that is a function of a difference between the first time and the second time, the probability of the candidate record is reduced 416. In particular, the threshold may increase with increase in the difference between the first time and the second time. In some embodiments, the larger the change in time zone and the smaller the intervening elapsed time, the greater the reduction 416 in probability.

The method 400 may include evaluating 418 whether battery parameters in the subject vector are consistent with last-received battery parameters found in the candidate record. In particular, step 418 may include evaluating a difference in a battery state in the subject vector relative to a last-received battery state in the candidate record, i.e. a battery state obtained from a last-received browser request that has been used to update the candidate record. The last-received browser request may have a first time in it. The subject vector also has a second time in it that is obtained from the browser request used to generate it. A difference in the last-received battery state of the candidate record may be compared to the battery state of the subject vector. If the difference exceeds a threshold that is a function of a difference between the first time and the second time, the probability of the candidate record is reduced 420. In particular, the threshold may increase with increase in the difference between the first time and the second time. In some embodiments, the larger the change in battery state and the smaller the intervening elapsed time, the greater the reduction 420 in probability. This accounts for the fact that charging and discharging of a battery are not instantaneous and therefore large changes in battery state with small elapsed time are unlikely to occur in the same device.

The method 400 may include evaluating 422 whether at least one accessible device listed in the subject vector matches an accessible device included in the candidate record. A browser request may include a list of one or more devices such as an additional screen, pointing device (mouse, trackpad), audio device, camera, or other peripherals that are coupled to the computing device 104a, 140b that issued the browser request. Accordingly, step 422 may include evaluating whether each and every accessible device in the subject vector is found in the candidate record. If not, then the probability of the candidate record is reduced 424. In some embodiments, the amount of the reduction increases with the number of accessible devices in the subject vector that are not found in the candidate record.

The method 400 may include evaluating 426 whether an IP (internet protocol) address or other network routing information (e.g., MAC (machine access code) address) included in the subject vector is found in the candidate record. If not, then the probability of the candidate record is reduced 428. In some embodiments, the amount of the reduction increases with the difference between a closest matching IP address in the candidate record and the IP address in the subject vector, accounting for the fact that IP addresses in the same domain or sub domain may still correspond to the same device.

The method 400 may include evaluating 430 whether an amount of local storage in the subject vector is consistent with the candidate record. Local storage refers to tracking data (cookies, etc.), browser history, and other information stored by the browser over time. Browser requests may list the amount of local storage. Accordingly, step 430 may include evaluating a difference in an amount of local storage in the subject vector relative to an amount of local storage in a last-received browser request that has been used to update the candidate record. The last-received browser request may have a first time in it. The subject vector also has a second time in it that is obtained from the browser request used to generate it. A difference in the last-received amount of local storage in the candidate record may be compared to the amount of local storage in the subject vector. If the difference exceeds a threshold that is a function of a difference between the first time and the second time, the probability of the candidate record is reduced 432. In particular, the threshold may increase with increase in the difference between the first time and the second time. In some embodiments, the larger the change in the amount of local storage and the smaller the intervening elapsed time, the greater the reduction 432 in probability.

The method 400 may include evaluating 434 whether one or more user attributes included in the subject vector are found in the candidate record. User attributes may include a name, company name, address, phone number, or the like. User attributes may include age, gender, income, or other demographic attributes. User attributes may further include interest or behavioral information such as user interest in certain colors, sizes, categories, sale or discounted items, new arrivals, rate of clicks per session, views per session, scrolling habits, whether the user operates a browser in incognito mode, and the like. For example, where the browser request is invoked by a user submitting a form, the browser request may include one or more user attributes. If each and every user attribute in the subject vector is either absent from or identical to user attributes in the candidate record, then the user attributes may be found 434 to match. If not, then the probability of the candidate record may be reduced 436. For example, the probability may be reduced according to the number of inconsistent attributes. Some attributes, if inconsistent, may result in a greater reduction 436 in the probability than others as determined by an operator to account for the relative importance of attributes. In another example, user activities such as search terms submitted, repetition of search terms, categories of products selected for viewing or purchasing, price range of products viewed or purchased, time frame of browsing activates (day of the week, time of day, etc.), domains of interest, and the like may also be user attributes that may be compared 434 between the BUID vector and the candidate record.

The method 400 may include evaluating 438 whether a window size (i.e., browser window size) in the subject vector are found in the candidate record. If the window size matches a window size in the candidate vector, they may be found 438 to match. If not, then the probability of the candidate record may be reduced 440. For example, the probability may be reduced according to an amount of the difference between the window size of the subject vector and the closest window size in the candidate vector, such as based on a sum or weighted sum of differences in width and height.

The method 400 may include evaluating 442 whether a location in the subject vector is consistent with the candidate record. Location data may be included in metadata of a browser request, derived from an IP address of the browser request, or provided by the user in a data submission, such as a request for information about the user's current location. Browser Step 430 may include evaluating a difference in the location in the subject vector relative to a location for a last-received browser request that has been used to update the candidate record. The last-received browser request may have a first time in it. The subject vector also has a second time in it that is obtained from the browser request used to generate it. A difference in the last-received location in the candidate record may be compared to the location in the subject vector. If the difference exceeds a threshold that is a function of a difference between the first time and the second time, the probability of the candidate record is reduced 444. In particular, the threshold may increase with increase in the difference between the first time and the second time. In some embodiments, the larger the change between the locations of the subject vector and the candidate vector, the greater the reduction 444 in probability.

The method 400 illustrates a sample of values in the subject vector that may be considered to determine the probability of a candidate record corresponding to the same user. Other values may also be evaluated in a similar manner.

Note also that the factors evaluated with respect to the method 400 and the corresponding reductions in probability may be performed in the context of a machine learning model. In particular, a machine learning model may be trained to adjust the probability for a give candidate record for a given subject vector. Training data may include candidate records and subject vectors that are known to be related or not related. The machine learning model may then be trained to distinguish between these two cases. The probability of candidate vectors as determined or adjusted by the machine learning algorithm may then be compared to a predetermined threshold and those below the threshold may be eliminated. Of those that remain, a highest probability case may be selected for purposes of generating content. If one candidate record meets a certainty threshold, the subject vector may be merged with the candidate record as described above. In a similar manner, the elimination of candidate records according to the method 300 may be performed using a trained machine learning model operating on parameters of the BUID vector and the candidate records.

Figure 5:
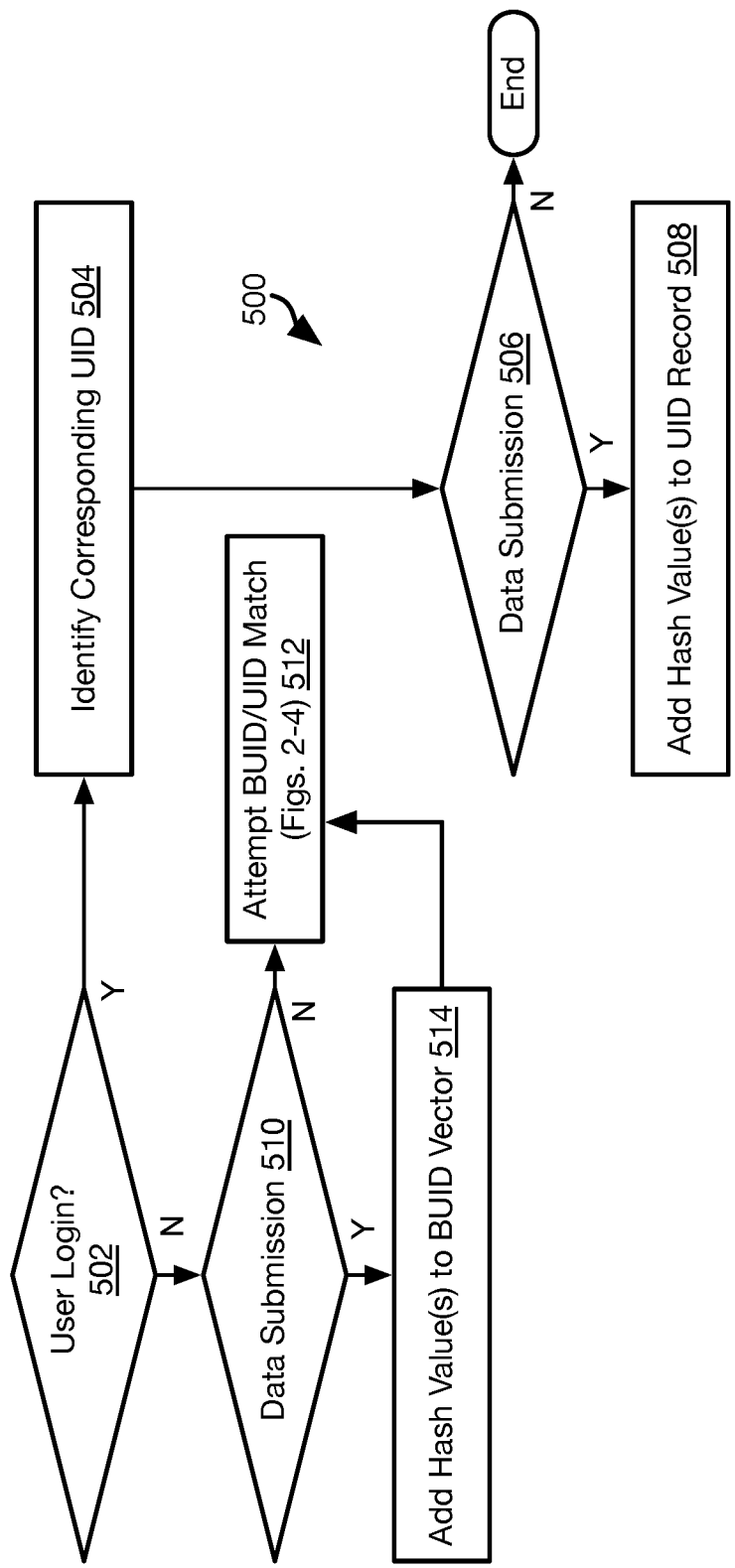
FIG. 5 is a process flow diagram of a method for accumulating hash values for a user record or website visit in accordance with an embodiment of the present invention.
Figure 6:
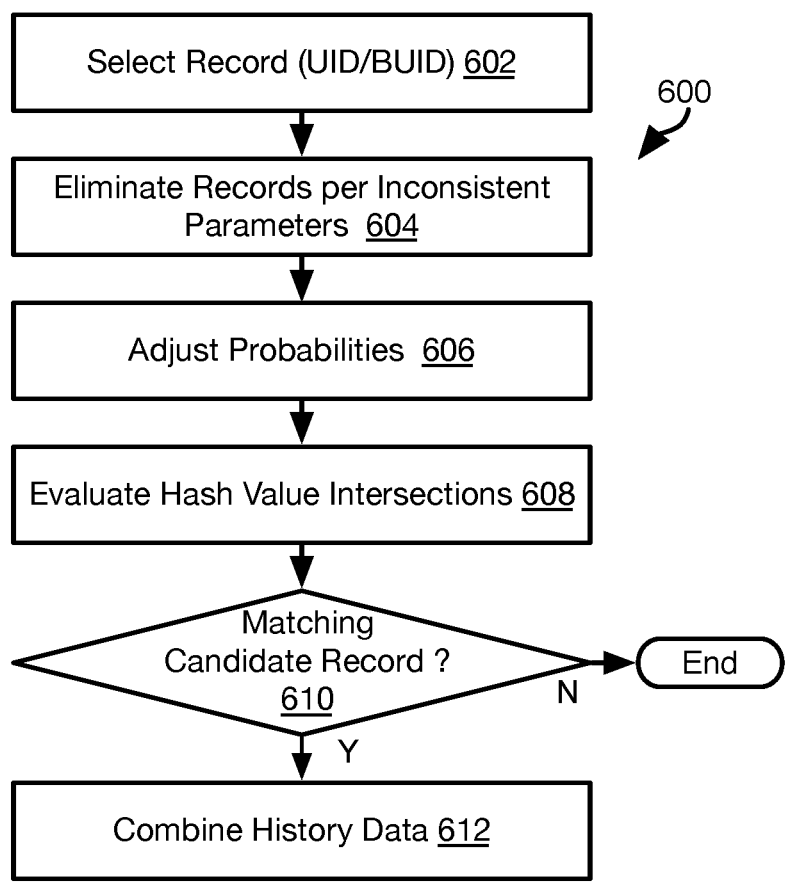
FIG. 6 is a process flow diagram of a method for relating records of activities on different devices in accordance with an embodiment of the present invention.

FIGS. 5 and 6 illustrates methods for linking a UID record 120 for one device with a UID record 120 for a different device. The method 500 may be executed by the server system 102. As described in the methods above, device information and information regarding software (browser, OS, plugins) executing on that device are used to associated BUID vectors 124 with a UID record 120. In many instances the same user may browse the web using multiple computing devices 104a, 104b, e.g. a home computer, work computer, mobile phone, tablet computer, etc.

The method 500 of FIG. 5 describes an approach for accumulating information that may be used to associated browsing activities on different devices with the same user. The method 500 may include evaluating whether a browser request or browser session included a user login, either in the form of providing a username and password, a previously-created credential, cookie data, or some other form of express identification uniquely associated with a user. If so, then the corresponding UID record 120 for that login information is identified 504. If one or more data values are found 506 to have been submitted during the browser session, hashes of these values are added 508 to the corresponding UID record 120. Hash values may also be generated for other data included in a browser request, including some or all of the items of data stored and evaluated according to the methods described with respect to FIGS. 1 through 5. In particular, hash values for location data may be included. The location data may be derived from an explicit value included in the browser request, derived from the IP address of the browser request, or otherwise provided in navigation data provided by the user.

Generating the hash values in step 508 and other hash-generating steps of the method 500 may include generating and storing hashes without data labels indicating the type of data (name, credit card, address, phone number, etc.) from which the hash is derived. As for step 302 of the method 300, the hash values may be generated according to a lossy function such that each output of the hash function could represent a range of possible input values. The hash function is also preferably such that the range of possible input values are similar to one another, e.g. a contiguous range of values. Examples of suitable hash functions include MD5 and similar hash functions or any other hash function known in the art. The hash value may be 32, 64, or 128 bits. To ensure that the original data is not recoverable, a 64 bit or smaller size is preferable. To protect privacy, the submitted data values may be converted to hash values on the computing device 104a, 104b on which they were received, such as by a software component embedded in a website, plugin, or other component executing within the browser on the computing device 104a, 140b. In this manner, data values are not acquired in their original form. Hash values may further be encrypted during transmission and storage to protect privacy.

If insufficient information is found 502 to have been provided to associate a browsing session with a particular user, the method 500 may still include evaluating 510 whether any data is submitted during the session. If not, metadata included in browser requests may still be used to attempt 512 to match a BUID vector 124 for a browser request with a UID record 120 according to the methods of FIGS. 2-4.

If data values are submitted, then hashes of these values are added 514 to the BUID vector 124 in the same manner as for step 508 and step 512 may also be performed to attempt to match the BUID vector 124 to a UID record 120.

Figure 4:
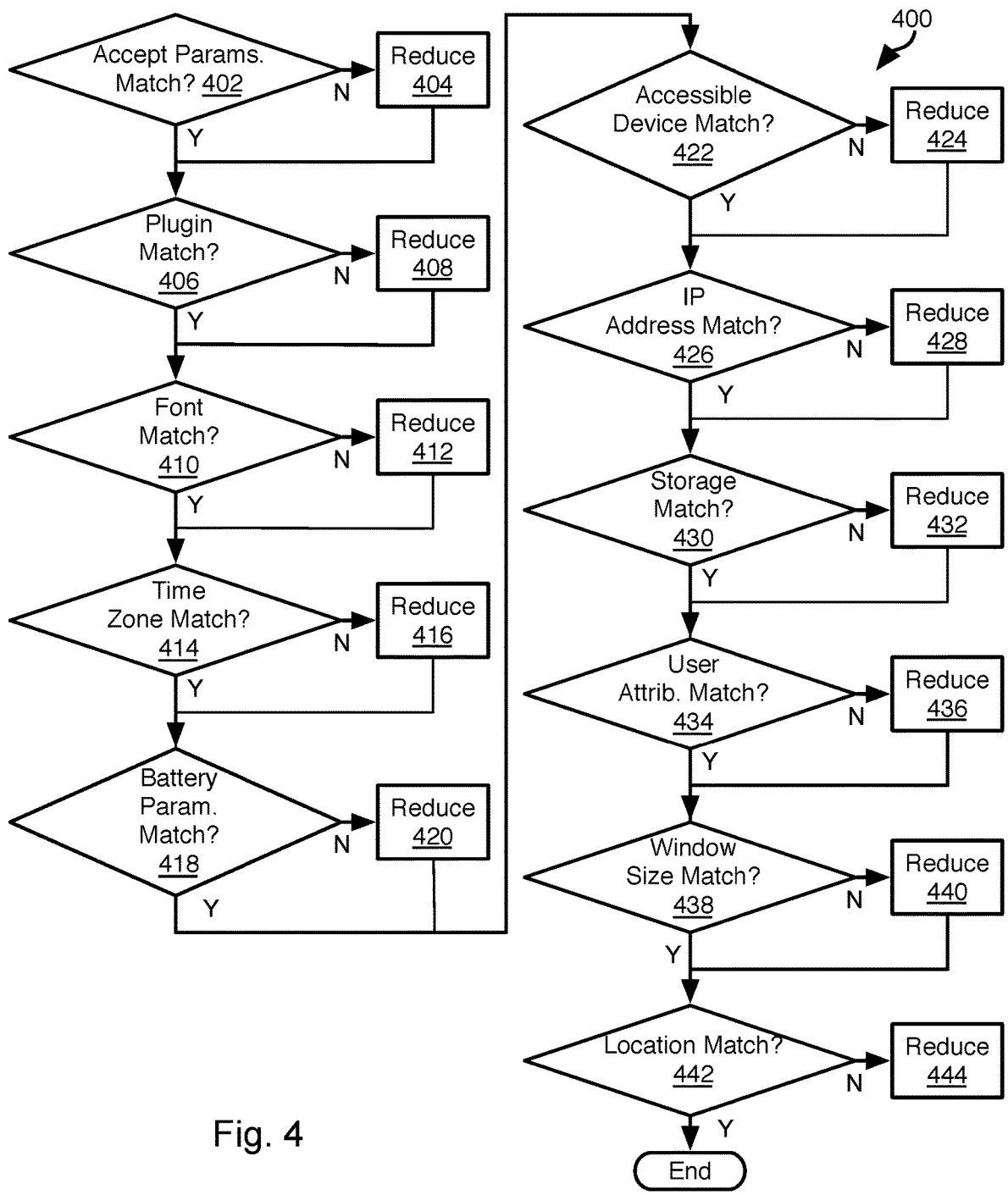
FIG. 4 is a process flow diagram of a method for adjusting the probability that a candidate user record corresponds to a visit to a web site in accordance with an embodiment of the present invention.

It may occur in some instances that the BUID vector 124 is matched to a UID record 120 with sufficient certainty according to the methods of FIGS. 2-4 such that the data of the BUID vector 124 is added to the UID record 120. Accordingly, the hash values of step 514 will be incorporated into that UID record 120. The hash values may be generated and added either before or after the BUID is matched to a UID record 120. As noted above with respect to step 508, hash values may be generated and added for data in the browser request, particularly location data.

FIG. 6 illustrates a method 600 may include selecting 602 a record ("the selected record"), which may be either UID record 120 or a BUID vector 124 from a database of such records. In particular, the method 600 may be executed for some or all of the UID records 120 and BUID vectors 124 in a database in order to identify cross-device associations with respect to other UID records or BUID vectors 124. In some embodiments, the method 600 is executed each time a UID record 120 or BUID vector 124 is updated or changed according to any of the methods of FIGS. 2-5. For purposes of the description of the method 600, "candidate record" shall be understood to refer to either of a UID record 120 or BUID vector 124.

The method 600 may include eliminating 604 one or more candidate records that are inconsistent with the selected record. This may include evaluating some or all of the criteria described above with respect to the method 300 of FIG. 3. In particular, inasmuch as the method 600 includes performing cross-device identification, only parameters that are not device specific may be evaluated at step 606. In particular, parameters such as time zone, language, location, time overlap of browser sessions, hashes of passwords or of other user-submitted values, and IP address may be evaluated at step 604 and eliminated if found to be inconsistent, such as according to the approaches described above with respect to the method 400.

The method 600 may further include adjusting 606 probabilities for one or more candidate records that remain after the elimination step 604. This may include evaluating some or all of the parameters evaluated according to the method 400. As for step 604, parameters that are not device specific may be evaluated such as some or all of language, time zone, IP address, user attributes, location, and time overlap of browser sessions. The result of step 606 may be probabilities associated with candidate records.

The method 600 may include evaluating 608 intersections of hash values in the selected record with the candidate records and adjusting the probabilities associated with the candidate records accordingly. In particular, candidate records that match a hash value or group of hash values in the selected record may be identified. In particular, for each hash value that matches between the selected record and the candidate record, the probability for that candidate record may be increased. The degree of adjustment may increase with the infrequency of occurrence of the hash value. For example, where a matching hash has a large number of occurrences among the candidate records, the amount of the increase in probability may be smaller than where the number of occurrences of the matching hash is smaller. A hash of a user's email, for example, may have few occurrences and therefore be highly predictive whereas a hash of a user's first name has many occurrences and therefore is less predictive.

If the probability of a candidate record following steps 606-608 is found to 610 meet a threshold certainty, then the content of that candidate record and the selected record may be combined 612, such as by merging the content of one record with the other. For example, where one of the selected record and matching record is a UID record 120 and the other is a BUID vector 124, the data of the BUID vector 124 may be added to the UID record 120. Where both the selected and matching records are UID records 120, then the data of the newer UID record 120 (last created) may be added to the older UID record 120. Where both are BUD vectors 124, the data of the newer BUID vector 124 may be added to the older.

Adding data from one record to another may include augmenting the global data 126*a*, device data 126*b*, browser data 126*c*, and possibly user history, of one record with corresponding data from the other record. Adding data from one record to another may preserver association of the data form one record, i.e. its source as from a different record may be stored. In other embodiments, this is not the case.

Note that in some instances a single unique value may be found in only one of the other records. However, in some instances, the condition of step 608 may only be found to be met if two, three, or some other threshold number of hash values, as a combination, are unique to the selected record and the matching record. This is the case inasmuch as hash values correspond to a range of input values and a match does not necessarily indicate that the underlying input values were identical.

Note also that discrete steps 606-608 are described as being performed to determine the probabilities of candidate records with respect to the selected record. In other embodiments, the content of a candidate record and the selected record may be evaluated according to a machine learning algorithm that evaluates some or all of the parameters of the records to determine a probability that the candidate record and the selected record correspond to the same user. In a like manner, the elimination step 604 may be performed using a trained machine learning model processing some or all of the same parameters of the selected record and candidate record.

In some embodiments, steps 608-610 may also be used for identification of correspondence between a BUD vector and a candidate record according to the method 200. In particular, adjusting 218 the probability of a candidate record may include executing both the method 400 and evaluating hash value intersections as described above with respect to steps 608-610 in order to determine the probability for a particular candidate record.

Figure 7:
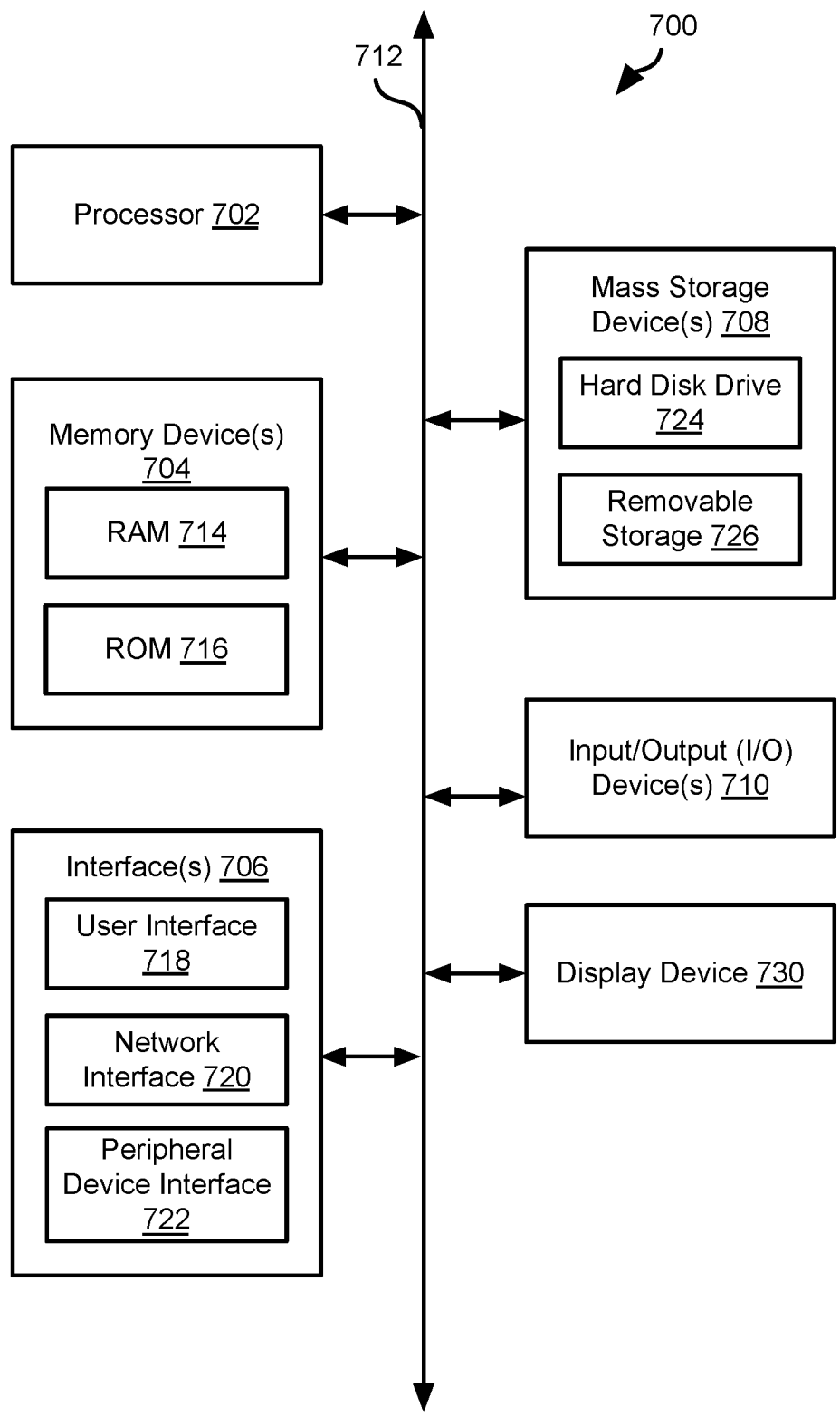
FIG. 7 is a schematic block diagram of a computer system suitable for implementing methods in accordance with embodiments of the present invention.

FIG. 7 is a block diagram illustrating an example computing device 700 which can be used to implement the system and methods disclosed herein. The server system 102 and computing devices 104*a*, 104*b* may also have some or all of the attributes of the computing device 700. In some embodiments, a cluster of computing devices interconnected by a network may be used to implement any one or more components of the invention.

Computing device 700 may be used to perform various procedures, such as those discussed herein. Computing device 700 can function as a server, a client, or any other computing entity. Computing device can perform various monitoring functions as discussed herein, and can execute one or more application programs, such as the application programs described herein. Computing device 700 can be any of a wide variety of computing devices, such as a desktop computer, a notebook computer, a server computer, a handheld computer, tablet computer and the like.

Computing device 700 includes one or more processor(s) 702, one or more memory device(s) 704, one or more interface(s) 706, one or more mass storage device(s) 708, one or more Input/Output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, etc.), keyboards, and the like.

Bus 712 allows processor(s) 702, memory device(s) 704, interface(s) 706, mass storage device(s) 708, and I/O device (s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising one or more processing devices and one or more memory devices operably coupled to the one or more processing devices, the one or more memory devices storing executable code effective to cause the one or more processing devices to:
   receive a browser request including request browser information, request global information, and request device information;
   identify, from a database of user records, a candidate record having candidate browser information, candidate global information, and candidate device information, that correspond to at least a portion of the request browser information, request global information, and request device information;
   check the consistency of the candidate browser information, candidate global information, and candidate device information relative to the request browser information, request global information, and request device information
   determine that the candidate browser information, candidate global information, and candidate device information is consistent with the request browser information, request global information, and request device information;
   adjust a probability for the candidate record for each of the candidate browser information, candidate global information, and candidate device information in view of the determined consistency;
   compare the adjusted probability to a first threshold condition; and
   determine the candidate record and the browser request correspond to the same user based on the comparison.

2. The system of claim 1, wherein the executable code is further effective to cause the one or more processing devices to identify the candidate record including:
   generate a first hash of values in the browser request; and
   determine that a hash of values in the candidate record matches the first hash.

3. The system of claim 2, wherein the executable code is further effective to cause the one or more processing devices to:
   evaluate an operating system version and a time included in the browser request;
   determine if the operating system version included in the browser request is older or newer than an operating system version included in the candidate record; and
   disposition the candidate record based on the determination.

4. The system of claim 2, wherein the executable code is further effective to cause the one or more processing devices to:
   evaluate a browser version and a time included in the browser request;
   determine if the browser version included in the browser request is older or newer than a browser version included in the candidate record; and
   disposition the candidate record based on the determination.

5. The system of claim 2, wherein the executable code is further effective to cause the one or more processing devices to:
   evaluate device type information in the browser request;
   determine if the device type information included in the browser request is different than device type information included in the candidate record; and
   disposition the candidate record based on the determination.

6. The system of claim 1, wherein the executable code is further effective to cause the one or more processing devices to:
   determine that the candidate record meets the first threshold condition;
   select content in response to the browser request based on data in the candidate record in response to the candidate record meeting the first threshold condition;
   determine that the candidate record meets a second threshold condition that is higher than the first threshold condition; and augment the candidate record with the request browser information, request global information, and request device information in response to the candidate record meeting the second threshold condition.

7. The system of claim 1, wherein the executable code is further effective to cause the one or more processing devices to:
   determine that the browser request is not within a threshold proximity to a time zone in the candidate record; and
   decrease the probability for the candidate record, wherein the threshold proximity to the time zone is a function of a difference between a first time included in the browser request and a second time associated with the time zone in the candidate record such that the threshold proximity increases with increase in the difference between the first time and the second time.

8. The system of claim 1, wherein the executable code is further effective to cause the one or more processing devices to:
   determine that a language listed in the browser request is also listed in the candidate record; and
   augment the probability for the candidate record based at least in part on the determination.

9. The system of claim 1, wherein the executable code is further effective to cause the one or more processing devices to:
   evaluate a first battery state included in the browser request with respect to last-recorded battery state included in the candidate record and an elapsed time between a first time included in the browser request and a second time associated with the last-recorded battery state; and
   if a change in charge for the first battery state relative to the last-recorded battery state is inconsistent with the elapsed time, decrease the probability for the candidate record.

10. The system of claim 1, wherein the executable code is further effective to cause the one or more processing devices to:
    determine that a font name in the browser request is different from a font name in the candidate record; and
    decrease the probability for the candidate record based at least in part on the determination.

11. The system of claim 1, wherein the executable code is further effective to cause the one or more processing devices to:
    determine that a plugin list in the browser request is different from a plugin list in the candidate record; and
    decrease the probability for the candidate record based at least in part on the determination.

12. The system of claim 1, wherein the executable code is further effective to cause the one or more processing devices to:
    determine that a window size in the browser request is different from a window size in the candidate record; and
    decrease the probability for the candidate record based at least in part on the determination.

13. The system of claim 1, wherein the executable code is further effective to cause the one or more processing devices to:
    determine that an accessible device in the browser request is not included among one or more accessible devices included in the candidate record; and
    decrease the probability for the candidate record based at least in part on the determination.

14. The system of claim 1, wherein the executable code is further effective to cause the one or more processing devices to:
    determine that a network address in the browser request is not included among one or more network addresses included in the candidate record; and
    decrease the probability for the candidate record based at least in part on the determination.

15. The system of claim 1, wherein the executable code is further effective to cause the one or more processing devices to:
    evaluate a first local browser storage amount included in the browser request with respect to a second local browser storage amount included in the candidate record and an elapsed time between a first time included in the browser request and a second time associated with the second local browser storage amount; and
    determine that a change in the first local browser storage amount and second local browser storage amount is inconsistent with the elapsed time; and
    decrease the probability for the candidate record based at least in part on the determination.

16. The system of claim 1, wherein the executable code is further effective to cause the one or more processing devices to:
    determine that user attributes included in the browser request are different from user attributes included in the candidate record; and
    decrease the probability for the candidate record based at least in part on the determination.

17. The system of claim 1, wherein the executable code is further effective to cause the one or more processing devices to:
    determine that a location in the browser request is different from a location included in the candidate record by a threshold amount; and
    decrease the probability for the candidate record based at least in part on the determination.

* * * * *